United States Patent [19]

Kempf

[11] Patent Number: 4,597,078
[45] Date of Patent: Jun. 24, 1986

[54] BRIDGE CIRCUIT FOR INTERCONNECTING NETWORKS

[75] Inventor: Mark F. Kempf, Stow, Mass.

[73] Assignee: Digital Equipment Corporation, Maynard, Mass.

[21] Appl. No.: 543,242

[22] Filed: Oct. 19, 1983

[51] Int. Cl.⁴ ............................................. H04J 3/26
[52] U.S. Cl. ...................................... 370/94; 370/85; 370/88
[58] Field of Search ................ 370/94, 88, 85, 92; 340/825.52, 825.53

[56] References Cited

U.S. PATENT DOCUMENTS

| | | | |
|---|---|---|---|
| 3,742,144 | 6/1973 | Brandenburg et al. | 370/88 |
| 3,749,845 | 7/1973 | Fraser | 370/88 |
| 4,099,024 | 7/1978 | Boggs et al. | 370/85 |
| 4,433,411 | 2/1984 | Gefroerer et al. | 370/94 |
| 4,510,492 | 4/1985 | Mori et al. | 370/88 |

Primary Examiner—Douglas W. Olms
Attorney, Agent, or Firm—William Cleaver

[57] ABSTRACT

The present system includes logic circuitry to be connected between at least two networks. When a message is sent by a station in a first network, the destination part of the message will be examined by the logic circuitry to see if the destination address has been recorded (stored) and if so to what network the destination station belongs. If the destination address is located in the sending network, the message is not sent to the non-sending network. If the destination address is located in the non-sending network, the message will be sent thereto. If the destination address is not recorded, i.e., it represents a new station, the message will be sent to the non-sending network (such a message is automatically sent to its own network). In the latter case when such a new station becomes a source station, its address will be recorded so that the next time such a station is a destination, the system will know in which network it is located. Further the present system removes from its stored addresses those addresses which are seldom used.

7 Claims, 3 Drawing Figures

BRIDGE CIRCUIT FOR INTERCONNECTING NETWORKS

BACKGROUND

It is well understood in the art of data processing that it is desirable to interconnect local networks. In the prior art such local networks have been coupled together through devices generally referred to as routers. Such router devices are normally peculiar to the manufacturer thereof, such that in order for one station, on a local network, to send messages to a second station, on another local network, the first station must transmit at least a two level address or involve a two level protocol arrangement. In other words the address arrangement in the prior art is analogous to a common telephone system wherein the first three digits, i.e. exchange number such as Gramacy 3 (GR3), is one level of address and the last four digits is a second level of address. The foregoing arrangement has been reasonably acceptable. However as users have commenced purchasing equipment from different manufacturers, problems have arisen with respect to communicating, from one network to another, through a router which is manufactured by a different manufacturer than the manufacturer of the stations communicating. The difficulties have arisen in part because the higher levels of protocol required in prior art systems and also because a station of a different manufacturer has great difficulty in providing information to a router of a first manufacturer even if the router has memory means. The present invention has only one level of address information, has a learning capability to increase its knowledge as to what stations are where, on any network, connected thereto, and includes a means for jettisoning relatively unused address information.

SUMMARY

The present invention, in a preferred embodiment, is taught to be dealing with two local networks. It should be understood that it could be dealing with more than two networks and with multiple bridge circuits connected with multiple local networks. In the preferred embodiment taught, there is connected to a first local network a first LANCE device and to a second local network a second LANCE device. When, for instance, a message is sent from the first local network to its associated LANCE device, the message is examined and if it is acceptable for further transmission, the LANCE device sends an interrupt signal to a microprocessor. Meantime the message has been stored in a buffer RAM. In response to the interrupt signal, the microprocessor is aware of which network has sent the message and fetches the destination address portion of the message, from the buffer RAM, to a look up controller circuit. The look up controller circuit is designed to take the destination address information and compare it against a group of destination addresses which are held in a look up RAM. The destination address information, in the look up RAM, includes a tag which indicates whether the destination address belongs to a station in the first or the second local network. If there is a match between the destination address portion of the message and a destination address in the look up memory, the microprocessor will send the message to the proper station through the bridge, or ignore the message if the sending station is on the same local network as the receiving station. If there is no match (because there is no destination address loaded in the look up memory which will match the destination address of the message), then the message will be sent to the other network. After operating on the destination address portion of the message, the system operates on the source address portion of the message. The source address portion is compared against the destination addresses stored in the look up memory and if there is no match, then the system has "learned" that another station is present and where it is located. This "learned" address information is temporarily stored in a "new source" RAM and at some later time is added, through reorganization by the microprocessor, to the look up memory destination addresses. The system insures that there will be available space in the look up memory by removing therefrom destination addresses which are not repeatedly used. This feature may be called into play when portable stations are "plugged in" at new locations which, of course, may mean a new network. For instance, and by way of example only, if a station is not addressed at its old network address for 15 minutes, then its old network address will be removed from the look up memory.

The objects and features of the present invention will be better understood in view of the following description taken in conjunction with the drawings wherein.

Figure 1:
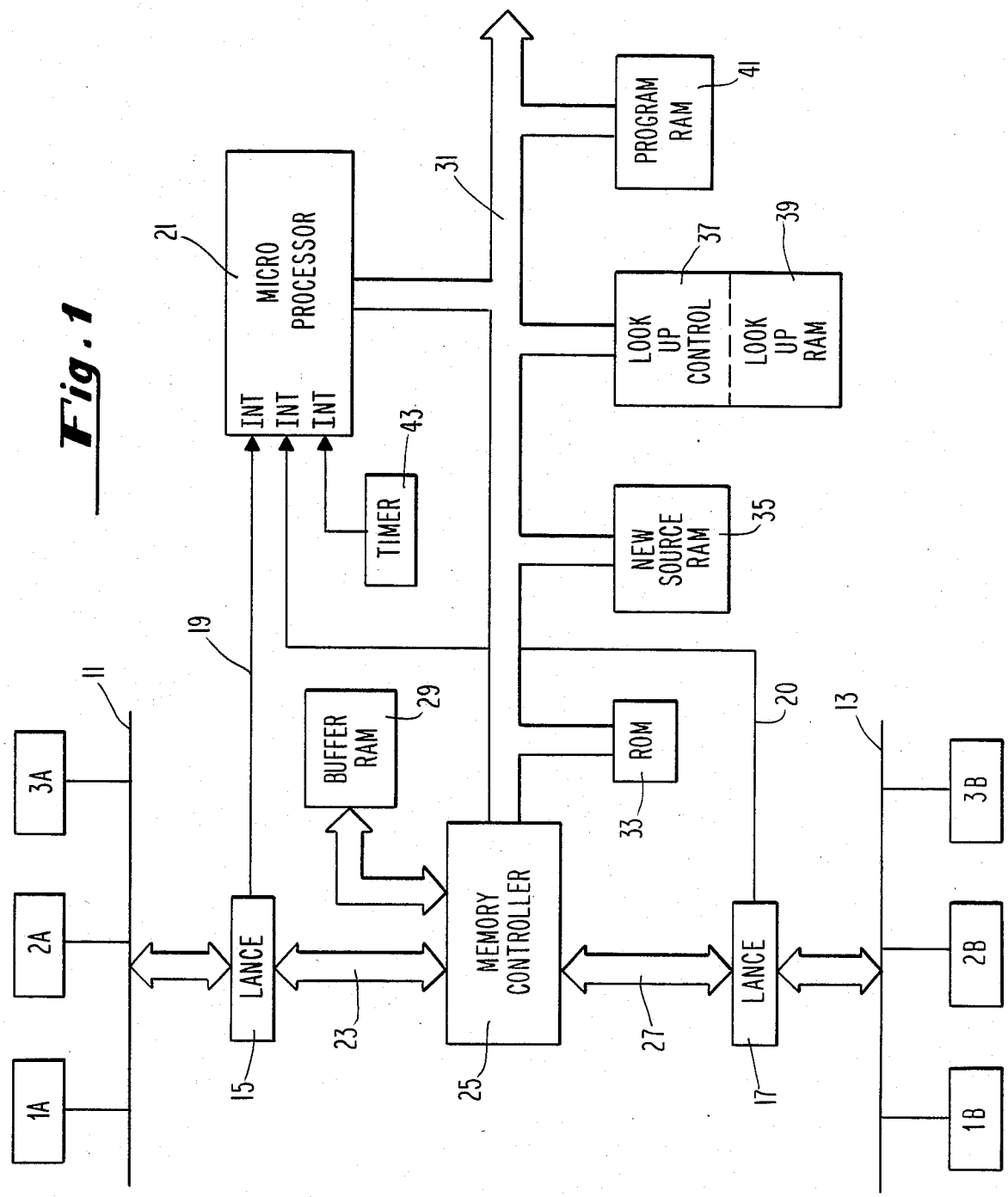
FIG. 1 is a block schematic diagram of the present system.

Consider FIG. 1. In FIG. 1 there is shown a first network made up of three stations 1A, 2A and 3A connected to a common bus 11. In addition in FIG. 1 there is shown a second network made up of three stations 1B, 2B and 3B connected to a common bus 13. It should be understood that there could be more than three stations in each network and there could be more than two networks.

Connected to the "A" local network is a LANCE 15, while connected to the "B" local network is a LANCE 17. Each of the LANCEs 15 and 17, in a preferred embodiment, is a MK 68590 device, manufactured by Mostek Company, a division of United Technologies Corporation. The LANCE device is designed to do a number of operations. First, a message transmitted from a station on a network is examined by its associated LANCE device to determine whether the message is complete and error free. For instance if the message were too long, or too short, or carries an indication that an error is present, or some other infirmity is present then the LANCE would not indicate to the system that the message should be transmitted through the bridge circuit. However if the LANCE device determines that the message received is suitable to be considered for further transmission, then the LANCE device 15, for instance, is connected to send an interrupt signal on line 19 to the microprocessor 21. Meantime the message is transmitted through the memory controller, while the LANCE 15 examines the message, to the Buffer RAM 29. In a preferred embodiment the microprocessor is a type 68000 manufactured by Motorola Corporation. Other types of microprocessors could be used.

It will be noted in FIG. 1 that the program RAM and the new source RAM are shown as separate components. The two foregoing RAMs, whose roles will be explained below, can be part of one data processor, or one RAM device, although in the present embodiment they are considered as separate components. Also shown in FIG. 1 is a look up controller, depicted as a separate component and it should be understood that the look up controller circuitry could be included in a data processor. The foregoing mentioned separate components are employed and discussed as separate components in the preferred embodiment in order that system can be discussed with a relatively uncomplicated microprocessor.

Further as can be seen in FIG. 1, the LANCE device 15 is connected through channel 23 to the memory controller circuit 25 while the LANCE device 17 is connected thereto through channel 27. The memory controller 25 is depicted in detail in FIG. 2. As mentioned earlier, connected to the memory controller 25 is a buffer RAM 29. The memory controller 25 is a three port device with bidirectional data paths to and from the LANCE 15, the LANCE 17 and microprocessor 21.

Connected to the bus 31 in a ROM 33, a new source RAM 35, a look up control circuit 37 which is connected to a look up RAM 39, and a program RAM 41. The ROM 33, in a preferred embodiment is a 2764 manufactured by Intel Corporation. The new source RAM 35, in a preferred embodiment is a 2167 manufactured by Intel Corporation. The program RAM 41 in a preferred embodiment is a 2167 manufactured by Intel Corporation.

Consider the circuitry of FIG. 1 to understand the overall operation of the system. Assume a first situation where station 1A wants to send a message to station 2B. In this first situation, station 1A would send a message which would have 64 bits of preamble information, 48 bits of destination address information, 48 bits of source address information, variable amounts of user data thereafter and finally a group of signals which indicates the presence or absence of an error. The present system is principally involved with the destination address signals and the source address signals. The message from station 1A would have a destination address of station 2B and a source address of station 1A.

Figure 3:
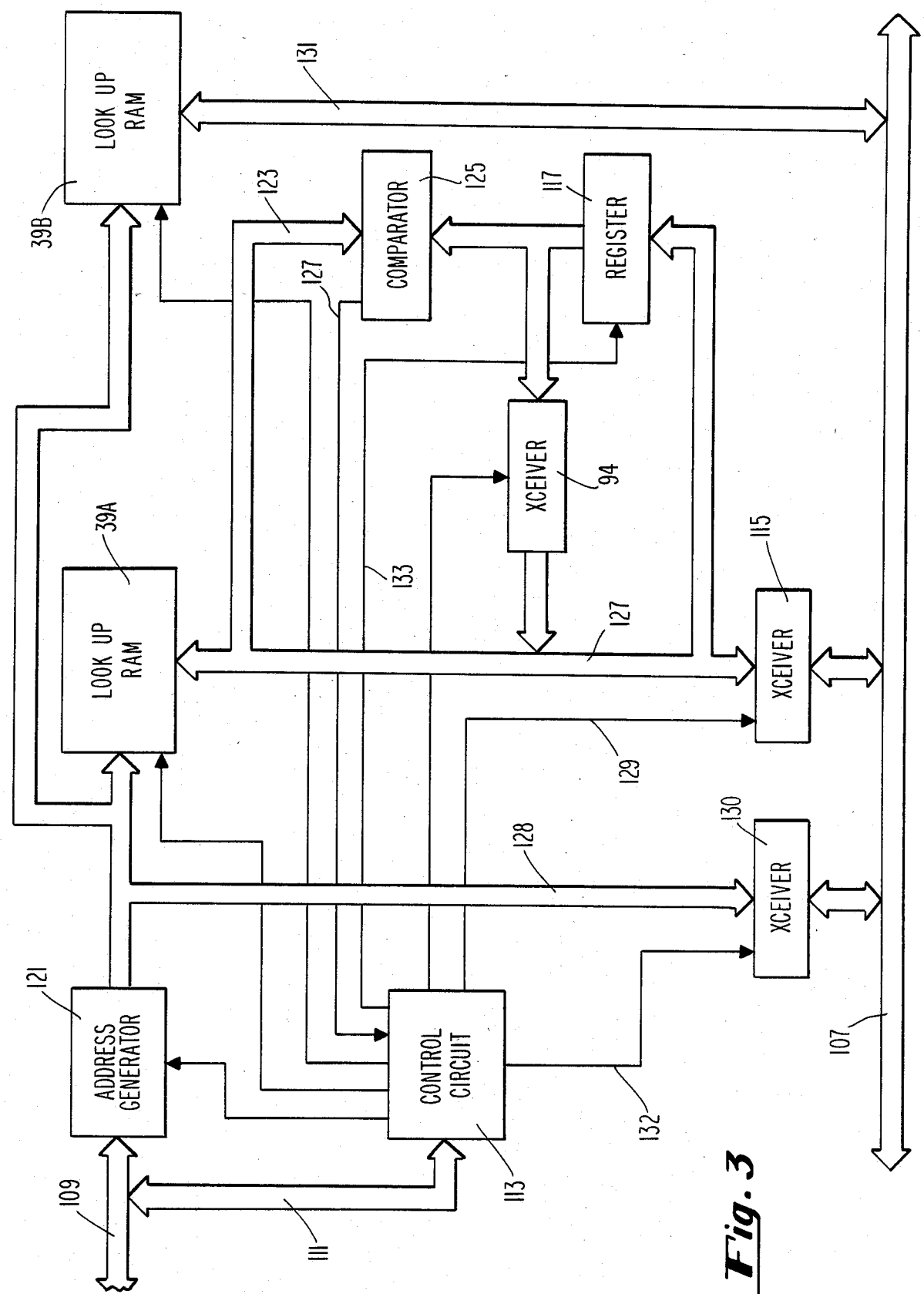
FIG. 3 is a block schematic diagram of the look up controller circuitry.

The message would be transmitted to the LANCE device 15 whereat the preamble portion is decoded, the number of bits in the message are counted and the error status checked. The capacity to accomplish these functions is inherent in the LANCE device. If the LANCE device 15 finds no improprieties in the message format, the LANCE device 15 will generate an interrupt signal on line 19 to the microprocessor 21. As mentioned earlier in conjunction with the examination of the message by LANCE 15, the message is transmitted to the Buffer RAM 29. In response to the interrupt signal on line 19, the microprocessor 21 sends a set of address signals to the buffer RAM 29, to fetch therefrom the destination address portion of the message being held by the buffer RAM 29. The destination address information is transmitted along channel 31 to the look up control circuitry 37. It should be understood that the channel 31 is composed of at least 40 parallel lines, 24 of which are dedicated to address signals, and 16 of which are dedicated to data signals. As will be better understood when FIG. 3 is discussed, the address information from the buffer RAM 29 is received by the look up control circuit 37. The look up control circuit 37 is designed to compare the destination address signals from the buffer RAM 29 against a plurality, or library, of destination addresses held by the look up RAM 39. The loading of the destination addresses into the look up RAM 39 will be discussed below but for the moment it should be accepted that the look up RAM 39 is storing a plurality of destination addresses. The destination addresses in the look up memory have additional information associated therewith. The additional information provides an indication of whether the station, whose address is stored in the look up memory, is on the "A" network or the "B" network.

After the comparison has been made by the look up control circuitry 37, the microprocessor 21 is advised that the destination address is present in the look up memory and the addressee is not on the "A" side. Thereafter the microprocessor 21 sends a request to the buffer RAM 29 to fetch the source address signals from the message it is holding and forward said source address signals to the look up control 37. Meantime the microprocessor sends a command signal to the LANCE which instructs the memory controller to fetch the message from the buffer RAM 29 and transmit it over channel 27 to the LANCE 17, therefrom to the common bus 13 and subsequently station 2B will respond to accept the message.

When the source address is received by the look up control circuit 37, it is compared against the destination addresses, as was the destination address of the message previously described. This procedure is part of the "learning" capability of the present system. If the source address is found to match a destination address, in the look up RAM 39, then the microprocessor is so advised and nothing more is done with this part of the operation. On the other hand if the source address is not found amongst the destination addresses held by the look up RAM 39, then the microprocessor directs the look up control circuitry 37 to send the source address to the new source RAM 35 and the microprocessor adds the above mentioned additional information thereto, i.e. in our example, the additional information indicates in which network station 1A (the source) is located. The system operates to self learn and load the look up RAM 39 by adding destination addresses (from source addresses) to the look up RAM 39 when a station on a network sends a message. When a station on a network sends a message, the message includes the source address as explained earlier and the interrupt signal indicates to the microprocessor from which network the message is being sent, hence in which network the source is located. Accordingly, even after just starting the system up, as the various stations send messages, their addresses are added to the look up RAM and the bridge circuit system commences to "learn" where the various stations are located.

Returning to our example we find that when the microprocessor 21 has some spare time, it undertakes a programmed routine to fetch address signals from the new source RAM 35 and transfers them to the look up control circuitry to be inserted into the proper location in the look up RAM 39. As will become better understood from the discussion of FIG. 3, the microprocessor 21 can effect a reorganization of the look up RAM 39. Thus far we have considered an example of sending a message from station 1A to station 2B and have seen how the circuitry works.

If in a second situation, the station 1A sends a message to station 3A a somewhat different scenario is painted. The "A" network does not need the bridge circuit to enable station 1A to send a message to station 3A. However the bridge circuit makes use of this operation in its self learning procedure. In our second example when the message is sent from station 1A to station 3A it is still received by the LANCE 15 simultaneously with it being received by the station 3A. The LANCE 15 does not "know" that the message need not go through the bridge and it handles the message as before. However in the second situation when the destination address (that of station 3A) is compared with the look up RAM addresses, it will be determined that station 3A is on the same network as the sending station 1A, or the source, and hence the message in buffer RAM 29 will not be forwarded through the bridge. At the same time, the source address will be compared, as described before and if not found in the look up RAM 39 it will be added thereto as explained above.

If we alter the facts in our second example and assume that the destination address (station 3A) is not in the look up RAM, then a variation on the operation occurs. The message is received by the LANCE 15, stored in the buffer RAM 29, and the destination address compared, all as explained before. However in this last situation the microprocessor is advised that the network location of the station is unknown, in fact its existence is unknown. In this situation the microprocessor directs the LANCE to cause the memory controller to fetch the message from the buffer RAM and send it to the "B" network. In accordance with the philosophy of the bridge system, if the destination address is not identified with a network, it will be transmitted through the bridge. Sooner or later the station 3A will send a message and then its address (sent as a source) will be added to the look up RAM and its whereabouts will no longer be unknown as was the case in the variation of the second situation just discussed.

The capacity to transmit messages when the destination address is not identified with a network enables the present bridge system to handle situations where if the look up RAM should become filled, and the destination address for a station could simply not get loaded into the look up RAM, messages sent to that station would be transmitted and received. The capability to transmit, when a station's address is not identified with a network, permits the system to operate before the learning algorithm takes effect, i.e. the system accomodates stations which are on a connecting network but which have not as yet been identified from a source address. An example of such a situation could be a data processing system in an office building, or a university building, where each floor is a network and a portable terminal is moved from the first floor to the second floor and wherein from its new location it has not yet been identified.

Some other features which can be gleaned from FIG. 1 have not been discussed. The ROM 33 is a non volatile memory in which there is stored all of the programs necessary to operate the microprocessor 21 in the present bridge system. Program RAM 41 is a volatile memory to which the current program signals are transferred from ROM 33 and which acts as the scratch pad memory and current program memory for the microprocessor 21.

The present bridge system also includes, philosophically, the notion that if a station is not active, then its address should be deleted to make room for more active station addresses. This notion is implemented by having the timer 43 provided an interrupt signal at some given time period, for instance by way of example every 100 milliseconds. Other time periods could be used. When the timer 43 sends said last mentioned interrupt signal, the microprocessor goes into a programmed routine whereby every destination address in the look up RAM is brought therefrom and the clock bits associated therewith are decremented. The clock bits are also additional information bits added to the destination addresses when they are loaded in the look up memory. The clock bits will have some value, for instance, the value of fifteen minutes in some binary code. Other value could be used. When the clock bits have been decremented to zero, the associated destination address is eligible for being removed in a reorganization operation or during an entry of addresses from the new source RAM 35. It should be understood that when a destination address in the look up RAM has been involved in a match, the data processor automatically resets its clock bits to the maximum value.

The interrupt signals from LANCE 17 are sent on line 20. It should be understood that although interrupt signals are sent to the microprocessor 21, the system could be operated where the LANCEs merely generate a "need attention" signal and the microprocessor could regularly pole the LANCEs to obtain the equivalent of an interrupt signal by virtue of the "need attention" signal. The system is arranged by the programmer so that LANCE 15 loads the messages it handles in predetermined addresses in the buffer RAM 29 and in a similar fashion LANCE 17 loads the messages it handles in different predetermined addresses. The microprocessor 21 provides instructions to the LANCEs 15 and 17 to accomplish the foregoing. The microprocessor is programmed to keep an account of what addresses the respective LANCEs will use and in fact in what addresses in the buffer RAM, particular messages have been stored. This programming arrangement enables the microprocessor to fetch from the buffer RAM the destination address information and the source address information of a particular message, make a decision as to whether or not that message should be transmitted on, add network location information to the addresses, etc. as described above.

Figure 2:
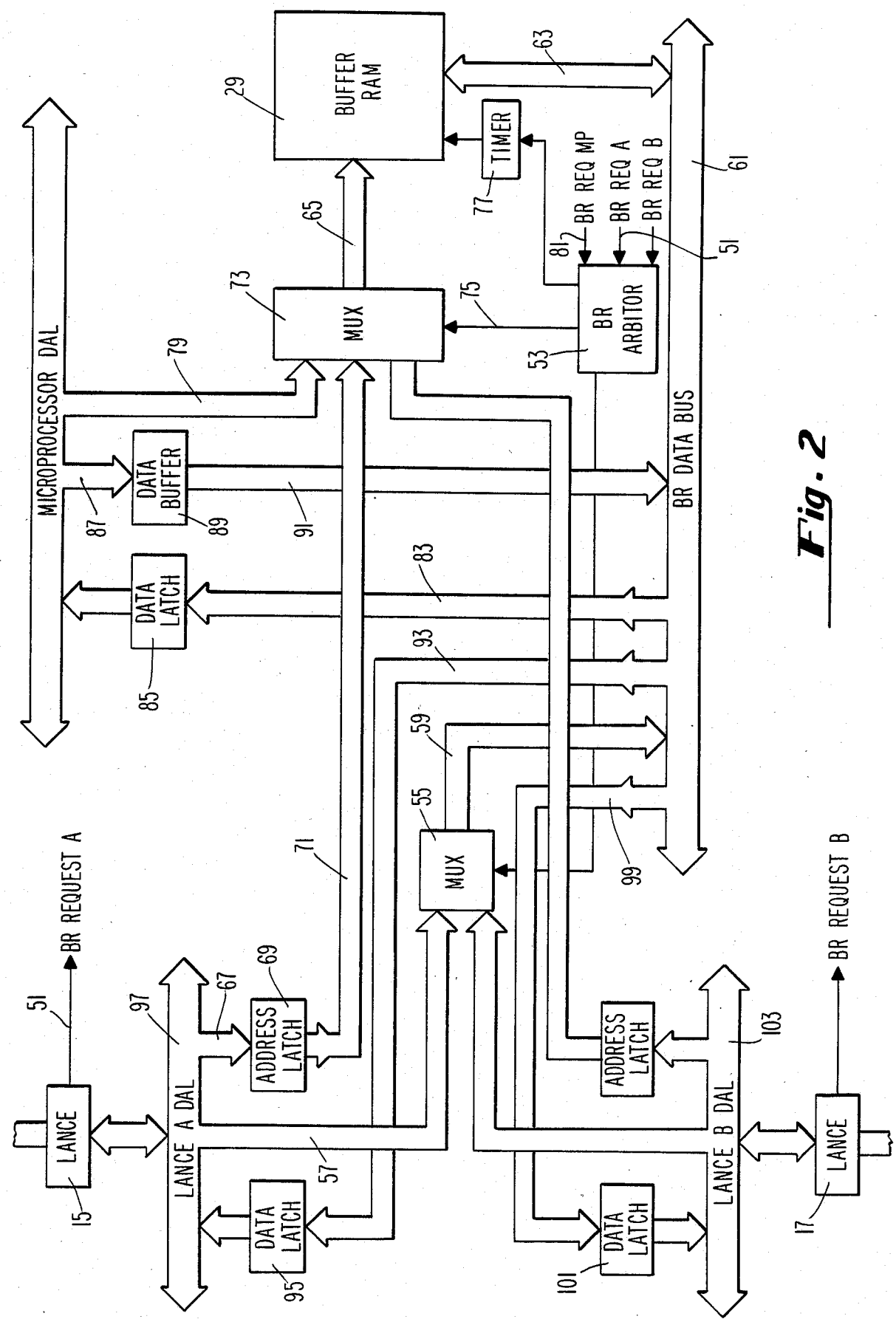
FIG. 2 is a block schematic diagram of the memory controller.

Consider FIG. 2 which is a detailed block diagram of the memory controller 37. In FIG. 2 the LANCEs 15 and 17 are shown as well as the DAL Bus 31 from the microprocessor 21 of FIG. 1. In addition the buffer RAM 29 as shown in FIG. 1 is depicted. It will be recalled that in our first example a message was sent from station 1A to station 2B. The system operates such that when the LANCE 15 receives the message front station 1A it generates a buffer RAM request signal on line 51, which is transmitted to the buffer RAM arbitor circuit 53. The buffer RAM Arbitor is comprised of a programmable array of logic integrated circuits which are commercially available and in a preferred embodiment, are manufactured by Advanced Micro Devices Corporation. The BR Arbitor 53 generates a steering signal to the MUX (multiplexer) 55 so that the message from LANCE 15 can be transmitted along channel 57, through the MUX 55, along channel 59, to the buffer RAM data bus 61. The message is transmitted from the BR data bus 61, along channel 63, to the buffer RAM 29 and is located therein at an address specified by the signals on channel 65. It will be recalled that the LANCE 15 is provided with address information from the microprocessor 21 and in accordance with transmitting this message to the buffer RAM 29, as just described, the LANCE 15 transmits a set of address signals on Channel 67, through the latch 69, along channel 73 to the MUX 73. The MUX's 55 and 71 are each a 74S158 manufactured by Signetics Corporation. The MUX 73 has received a steering signal on line 75 to direct the address signals on channel 71 to channel 65. The BR Artitor 53 sends a start signal to the timing circuit which provides clock and read/write signals to the buffer RAM 29. The buffer RAM 29, which in the preferred embodiment is a 8264 manufactured by Fujitsu Corporation, operates in response to clock and read/write signals. The microprocessor 21 has been programmed to fetch the destination address portion of the message by addressing the location in the buffer RAM whereat the destination address information is located. Therefore, assuming that the LANCE 15 has sent an interrupt signal as described earlier, the microprocessor will send address signals on the DAL bus 31, along Channel 79, to the MUX 73. In response to a BR request MP signal on line 81, the BR arbitor 53 will send a steering signal on line 75 to cause the MUX 73 to pass the address signals on channel 79. Accordingly the destination address portion of the message will be transferred from the buffer RAM 29, along line 63, along the BR data bus 61, along channel 83, through latch 85, to the microprocessor DAL 31. Hence the destination address portion of the message is transmitted from the buffer to the look up controller 37 described in connection with FIG. 1. When the microprocessor requires the source address portion of the message, it fetches it the same way except, of course, that the address for the source address portion of the message is different.

When the microprocessor 21 has made a decision that the message, in our example, should be sent from the buffer RAM 29 (the message originally from station 1A) to station 2B, then the microprocessor sends instruction signals on DAL 31, along channel 87, through latch 89, along channel 91 to the BR data bus 61, therefrom along channel 63 to the buffer RAM 29. Periodically the LANCE 15 will check the address locations in the buffer RAM 29 whereat such instruction signals are stored and when such instruction information is present, the appropriate signals are transmitted along BR data bus 61, along channel 93, through latch 95, through LANCE A DAL 97 to the LANCE 15. In response thereto the LANCE 15 sends address information to fetch the entire message from the buffer RAM 29, along channels as previously described. The message signals are transmitted along Channel 63, along bus 61, along Channel 99, through latch 101, along DAL 103, to the LANCE 17 and therefrom to station 2B. The flow of address information and data information from LANCE 17 should be readily apparent from FIG. 2 and it will not be discussed further.

It should be apparent that if the microprocessor 21 decides not to forward the message from the buffer RAM 29, there will be no instruction to the LANCE 15 via the buffer RAM as described above.

Consider FIG. 3 which depicts the make up of the look up controller 37 of FIG. 1. In FIG. 3 the lines of the DAL bus 31 which carry data signals are separated out and appear as a data bus 107, while the lines of the DAL bus 31 which carry address signals are separated out and appear as an address bus 109.

It will be recalled from the discussion of the operation of the circuitry of FIG. 1 that when the LANCE advises the microprocessor 21 that a message is ready to be processed, the destination address signals of the message are fetched from the buffer RAM 29 and brought to the memory controller 25. Those destination address signals arrive on the data bus 107 of FIG. 3. Prior thereto the microprocessor 21 has sent instruction signals over the bus 109, along channel 111 to the control circuitry 113. The control circuit 113 in a preferred embodiment is a 16R6 Programable Array Logic manufactured by Monolithic Memories. The control circuit 113 provides a control signal to the transceiver 115 and hence the destination address signals are passed through the transceiver 115 and loaded into the compare register 117. In the preferred embodiment the transceivers are 74LS245 devices manufactured by Signetics, while the register 117 is composed of 16R4 PAL devices manufactured by Monolithic Memories. The register 117 in a preferred embodiment is a 48 bit register but is should be understood that other bit length registers could be used, if other address configurations so required.

The look up controller circuit of FIG. 3 undertakes the comparison operation on its own, in response to starting address signals on channel 109 and a command signal on line 119. By way of example if the look up RAM 39A were designed to accommodate 8000 addresses then the microprocessor could be programmed to provide a starting address of 4000. The address signals for the address 4000 would be provided to the address generator 121. In accordance with the control signal on line 119, the address 4000 would be transmitted to the look up RAM 39A and the destination address at address 4000 would be transmitted along channel 123 to the comparator circuit 125. In this preferred embodiment the comparator circuit 125 is composed of 16R4 PALs manufactured by Monolithic Memories. The comparator circuit 125 does a parallel signal comparison with the destination address signals in register 117 and a result signal, indicating either "greater than" or "equal to" is transmitted on Channel 127 to the control circuit 113. If the result signal is "greater than", meaning that the destination address in the look up RAM is greater than the destination address from the buffer RAM, then the address generator in response to a control signal on line 119 will provide a second address of, for instance, 2000 to hopefully find a closer match. If the result signal indicated neither "greater than" nor "equal to", the system would recognize that the destination address brought from the look up RAM 39A is "less than" the destination address from the buffer RAM and hence the address generator (in response to a control signal from control circuit 113) would generate a higher signal, perhaps the address 6000. This process would continue until the selected destination addresses in the look up RAM 39A have been compared with the destination address in the register 117. Two possible results can occur. In a first instance there could be a match somewhere during the comparison and at that time an "equal to" signal would be generated on line 126. In response to the "equal to" signal the address generator would halt generating new addresses and would hold the last address for further use. In response to the "equal to" result signal the address generator 121 sends the address it has stored to the microprocessor 21. The microprocessor 21 uses that address to address the RAM 39B so that the destination address with the additional information (i.e. location as to A or B network and clock value) from the RAM 39B, will be sent to the microprocessor. The destination address from the address generator 121 is transmitted over channel 128, through transceiver 130, along channel 107 to the microprocessor. The transceiver is controlled by a control signal on line 132. The additional information is transmitted from the RAM 39B, along channel 131, to the bus 107 and therealong to the microprocessor. The microprocessor 21 then makes a decision as to whether or not the message should be sent to the non-sending network.

When the source address is compared, as explained in the discussion of the circuitry of FIG. 1, if there is neither an "equal to" nor a "greater than" in response to a predetermined number of comparison tries, then the system will assume that the source address is not present in the RAM 39A and will take steps to add the source address to the look up RAM 39A as an additional destination address. In a preferred embodiment this predetermined number (of comparison tries) is the log to the base 2 of the number of entry positions in the RAM 39A. If the predetermined number is reached and no match has been found then the control circuit sends a signal on line 111, back to the microprocessor which in turn fetches the source address from the buffer RAM 27 to the new source RAM 35. However at that time there is "additional information" entered into the new source RAM 35 to accompany the source address. The additional information hereinafter called the additional address is the address located in the address generator 121 when the "comparison tries" become exhausted. The system assumes that such an address is as close as the system can get and should be used for a starting address during the routine when that said source address is added to the RAM 39A. At some point in time, either because it is deliberately programmed, or when the microprocessor is programmed to recognize some "non busy" time, the microprocessor will reorganize the entire RAM 39A and during that reorganization add the station addresses from the new source RAM 35, in response to said additional addresses, associated with those station addresses. This operation is accomplished using the circuit of FIG. 3 as described below.

Starting with the high order addresses generated by the address generator (and in response to control signals on line 119), the destination addresses and their respective additional information are fetched from RAMS 39A and 39B. The destination addresses from the RAM 39A are transmitted to the register 117 while the additional information is transmitted along channel 131 to the bus 107. The additional information is transmitted to the microprocessor and is examined in the microprocessor for zero value in the clock portion of the additional information. If the destination address is still viable, the additional information is returned on Channel 107 and both the destination address in register 117 and the additional information are returned to the address provided by the address generator 121, which address location is one address location higher than it was when the information was fetched from RAMs 39A and 39B. In this way the entire content of the RAM may be moved one address space at a time toward the higher address locations of memory. This is possible because the unused part of memory is at the high order end. The address information from register 117 is transmitted through the transceiver 94, along channel 127 to the look up RAM 39A.

However when the microprocessor is in the reorganization mode for source address entry, it examines the address generator address at each step and when the address, in the address generator, is equal to an "additional address" of a source address, (as described above) in the new source address RAM, that source address is added to the RAMS 39A and 39B, at the address location present in the address generator. In effect the new destination address (from the source RAM) which is added to RAMS 39A and 39B is in the best location as determined during the source comparison (explained above). If there are, for instance, three new source addresses to be added during a reorganization, the microprocessor can be programmed to cause the address generator 121 to generate a first address which is three address positions higher than the high order address. When the address in the address generator equals an "additional address" of a source address, the pattern of the address generator will be changed to provide an address of two higher, and upon a second match to provide an address of one higher, and upon a third match to provide no change. Different formats for reorganizing the RAM could be employed and programmed for the microcomputer. The significant matter is that the look up controller provides data paths and control signals to effect a loop operation, with destination memory addresses to provide a reorganization.

It should also be understood that the circuitry of FIG. 3 can be used to examine the entire contents of RAMS 39A and 39B and purge the RAMS 39A and 39B of non viable addresses. The manner in which this is done is that the address generator, under instruction from the control circuit 113, and a starting address on channel 109, starts at the lower order address of the RAMS 39A and 39B. As explained before the additional information from 39B is examined and if the clock value is zero, the address counter is advanced to the next higher address but the information from the register 117 is not read out and is in fact written over. This non read out is effected by a control signal on line 133. The destination address from the next higher address in the look up RAM is reloaded into the previous address (by having the address generator decremented one address after detecting the first zero clock value). The address generator will follow a program from the microprocessor to fill in the vacant positions in the RAMS 39A and 39B as non viable destination addresses are dropped as explained above. Accordingly the RAMS 39A and 39B get purged of non-viable destination addresses.

I claim:

1. A bridge circuit for interfacing at least first and second local networks, each of which networks has a plurality of stations and each of which stations is formed to send message signals that include at least destination station address signals and source station address signals, said bridge circuit comprising in combination: first logic circuitry means connected to said first and second local networks to receive message signals therefrom and including first data storage means to temporarily store said message signals, said first logic circuitry means including means to examine message signals sent thereto to determine if said message signals should be further transmitted to a non-sending network and said first logic circuitry means further including means to generate first and second interrupt signals, respectively indicative of which of said local networks is transmitting said message signals; data processor means having at least two interrupt signal ports and connected to said first logic circuitry means; first memory means which can receive address signals and which has destination station address signals as well as network data signals stored therein which last mentioned signals are indicative of which of said network is associated with each destination station address; second logic circuitry means connected to said first memory means and to said first logic circuitry means and to said data processor means whereby in the event it is determined that said message signals should be further transmitted, said data processor means will cause at least said destination station address signals of said message signals to be brought from said first data storage means to said second logic circuitry means whereat they will be compared with destination station address signals brought to said second logic means from said first memory means to determine whether said message signals should be sent to a station connected to a network which did not initiate said message signals.

2. A bridge circuit according to claim 1 wherein there is further included a second data storage means connected to said first logic circuitry means and connected to said second logic circuitry means and wherein said data processor means includes means to transmit instructions to said first data storage means to fetch, from said first data storage means, source station address signals from message signals stored in said first data storage means, to be sent to said second logic circuitry means whereat said last mentioned signals are composed with destination station address signals stored in said first memory means and wherein if no match is found said data processor means will generate instructions to send said source station address signals to said second data storage means.

3. A bridge circuit according to claim 2 wherein said data processor means includes means to cause network data signals to be generated for said source station address signals to be stored therewith in said second data storage means.

4. A bridge circuit according to claim 1 wherein said data processor means includes means to generate time value signals, which last mentioned signals are stored along with stored associated destination station address signals in said first memory means and where there is further included timer circuit means connected to said data processor means to enable said data processor means to cause the value of said time value signals to be decremented to provide a basis for determining the frequency with which stations in said networks are addressed.

5. A bridge circuit according to claim 1 wherein said first logic circuitry means includes first and second controller circuitry means for local area networks (LANCEs) and wherein said first logic circuitry means includes first and second data address bases (DALs) connected respectively to said first and second LANCEs and wherein said first logic circuitry means includes control logic connected to said first and second DALs and to said first data storage means whereby if it is determined that message signals should be further transmitted to a station on a network which did not initiate said message signals, said message signals will be fetched from said first data storage means and transmitted to the one of said first and second DALs which is associated with the network which did not initiate said message signals.

6. A bridge circuit according to claim 1 wherein said second logic circuitry means includes signal comparator means and signal register means connected to said signal comparator means whereby destination station address signals and alternatively source station address signals from said first data storage means are received by said register to be transmitted to said signal comparator means and destination station address signals from said memory means are received by said signal comparator means to be compared with said destination station address signals from said signal register means and wherein said signal comparator means includes means to generate a result signal.

7. A bridge circuit according to claim 6 wherein said second logic circuitry means includes an address signal generator means connected to said memory means to generate address signals therefor and to transmit them thereto and wherein said address signal generator means includes control circuitry connected to said comparator means to cause said address signal generator means to continue to generate new addresses and alternatively to terminate generating new addresses.

* * * * *